(12) United States Patent
Huntley et al.

(10) Patent No.: US 11,693,695 B1
(45) Date of Patent: Jul. 4, 2023

(54) APPLICATION SELF-REPLICATION CONTROL

(71) Applicant: VMware, Inc., Palo Alto, CA (US)

(72) Inventors: Sean Huntley, NSW (AU); Marc Wayne Brotherson, Boulder, CO (US); Akeem Jenkins, Broomfield, CO (US)

(73) Assignee: VMWARE, INC., Palo Alto, CA (US)

( * ) Notice: Subject to any disclaimer, the term of this patent is extended or adjusted under 35 U.S.C. 154(b) by 0 days.

(21) Appl. No.: 17/228,044

(22) Filed: Apr. 12, 2021

(51) Int. Cl.
  *G06F 9/48* (2006.01)
  *H04L 9/40* (2022.01)
  *H04L 61/4511* (2022.01)

(52) U.S. Cl.
  CPC ........ *G06F 9/4875* (2013.01); *H04L 61/4511* (2022.05); *H04L 63/101* (2013.01)

(58) Field of Classification Search
  CPC ... G06F 9/4875; H04L 61/4511; H04L 63/101
  See application file for complete search history.

(56) References Cited

U.S. PATENT DOCUMENTS

| | | | | |
|---|---|---|---|---|
| 7,296,293 | B2* | 11/2007 | Isenberg | H04L 63/1433 726/25 |
| 8,875,296 | B2 | 10/2014 | Moore | |
| 9,800,603 | B1* | 10/2017 | Sidagni | H04L 63/1433 |
| 10,225,331 | B1* | 3/2019 | Freitas | H04L 67/1095 |
| 10,362,057 | B1* | 7/2019 | Wu | H04L 63/1408 |
| 11,528,317 | B1* | 12/2022 | Jenkins | H04L 67/561 |
| 2004/0128530 | A1* | 7/2004 | Isenberg | H04L 63/1433 726/25 |
| 2007/0261112 | A1* | 11/2007 | Todd | H04L 63/1483 726/2 |
| 2009/0103539 | A1* | 4/2009 | Keeler | H04L 41/5003 370/392 |
| 2014/0157405 | A1* | 6/2014 | Joli | H04L 63/1425 726/22 |
| 2014/0304231 | A1* | 10/2014 | Kamath | G06F 16/27 707/634 |
| 2014/0304354 | A1* | 10/2014 | Chauhan | H04L 67/1095 709/213 |
| 2014/0304355 | A1* | 10/2014 | Kamath | H04L 67/2842 709/213 |
| 2015/0370723 | A1* | 12/2015 | Nambiar | G06F 12/121 711/159 |
| 2015/0373044 | A1* | 12/2015 | Stiansen | H04L 63/302 726/22 |
| 2016/0044054 | A1* | 2/2016 | Stiansen | H04L 63/1416 726/24 |
| 2016/0366160 | A1* | 12/2016 | Kapoor | G06F 16/2358 |

(Continued)

*Primary Examiner* — Jimmy H Tran
(74) *Attorney, Agent, or Firm* — Patterson + Sheridan, LLP

(57) ABSTRACT

The disclosure provides an approach for controlling application self-replication in a network. Embodiments include determining, by a self-replicating application, one or more parameters related to a networking environment. Embodiments include applying, by the self-replicating application, one or more rules to the one or more parameters related to the networking environment. Embodiments include determining, by the self-replicating application, whether to replicate within the networking environment based on the applying of the one or more rules to the one or more parameters related to the networking environment.

20 Claims, 5 Drawing Sheets

(56) References Cited

U.S. PATENT DOCUMENTS

| | | | | |
|---|---|---|---|---|
| 2017/0026387 | A1* | 1/2017 | Vissamsetty | H04L 63/08 |
| 2017/0171244 | A1* | 6/2017 | Vissamsetty | H04L 63/1425 |
| 2018/0027009 | A1* | 1/2018 | Santos | H04L 63/1441 |
| | | | | 726/25 |
| 2018/0332005 | A1* | 11/2018 | Ettema | H04L 63/0227 |
| 2018/0367541 | A1* | 12/2018 | Ponnuswamy | H04L 63/101 |
| 2019/0199748 | A1* | 6/2019 | Gopalakrishna | G06F 21/566 |
| 2019/0253453 | A1* | 8/2019 | Vissamsetty | H04L 63/10 |
| 2019/0320018 | A1* | 10/2019 | Karaje | H04L 63/029 |
| 2020/0265358 | A1* | 8/2020 | Irimie | G06Q 10/0635 |
| 2020/0320023 | A1* | 10/2020 | Litichever | G06F 13/4282 |
| 2020/0389469 | A1* | 12/2020 | Litichever | H04L 63/0236 |
| 2021/0021640 | A1* | 1/2021 | Wu | H04L 63/029 |
| 2021/0029125 | A1* | 1/2021 | Moon | H04L 63/102 |
| 2021/0067551 | A1* | 3/2021 | Hebert | H04L 63/102 |
| 2021/0136110 | A1* | 5/2021 | Sites | H04L 63/1483 |
| 2021/0152597 | A1* | 5/2021 | Sites | G06N 3/084 |
| 2021/0200830 | A1* | 7/2021 | Shribman | H04L 67/1021 |
| 2022/0027496 | A1* | 1/2022 | Struttmann | G06F 16/9014 |
| 2022/0070197 | A1* | 3/2022 | Vu | G06F 21/577 |
| 2022/0078044 | A1* | 3/2022 | Shribman | H04L 63/164 |
| 2022/0103525 | A1* | 3/2022 | Shribman | H04L 63/029 |
| 2022/0188425 | A1* | 6/2022 | Wyatt | G06F 21/577 |
| 2023/0020504 | A1* | 1/2023 | Moon | G06N 20/00 |
| 2023/0024127 | A1* | 1/2023 | Moon | H04L 63/0428 |

* cited by examiner

APPLICATION SELF-REPLICATION CONTROL

BACKGROUND

Self-replicating applications are generally configured to instantiate new instances of themselves on a plurality of endpoints, such as virtual and/or physical computer systems in a networking environment. The goal of a self-replicating application is generally to spread to as many endpoints as possible in order to perform some operations on those endpoints. An anti-worm generally refers to a self-replicating application that is configured to perform benevolent operations, such as installing patches to vulnerable software, performing scans for the purpose of detecting and preventing threats and other issues, and/or the like.

While self-replication applications, such as anti-worms, can be beneficial, they are difficult to control using existing techniques, and may be vulnerable to subversion, such as by being co-opted for malicious purposes. For example, changing the payload of an anti-worm may potentially render it malicious. An anti-worm service provider cannot allow for the misuse of the service. However, prescribing the exact actions of individual anti-worms makes the service unlikely to be of use to customers with drastically different requirements and varying networking environments. Manual review of all actions of anti-worms is also not a suitable solution, as it does not scale well. As such, there is a need in the art for improved techniques of mitigating the risk anti-worm service misuse.

BRIEF DESCRIPTION OF THE DRAWINGS

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 1:
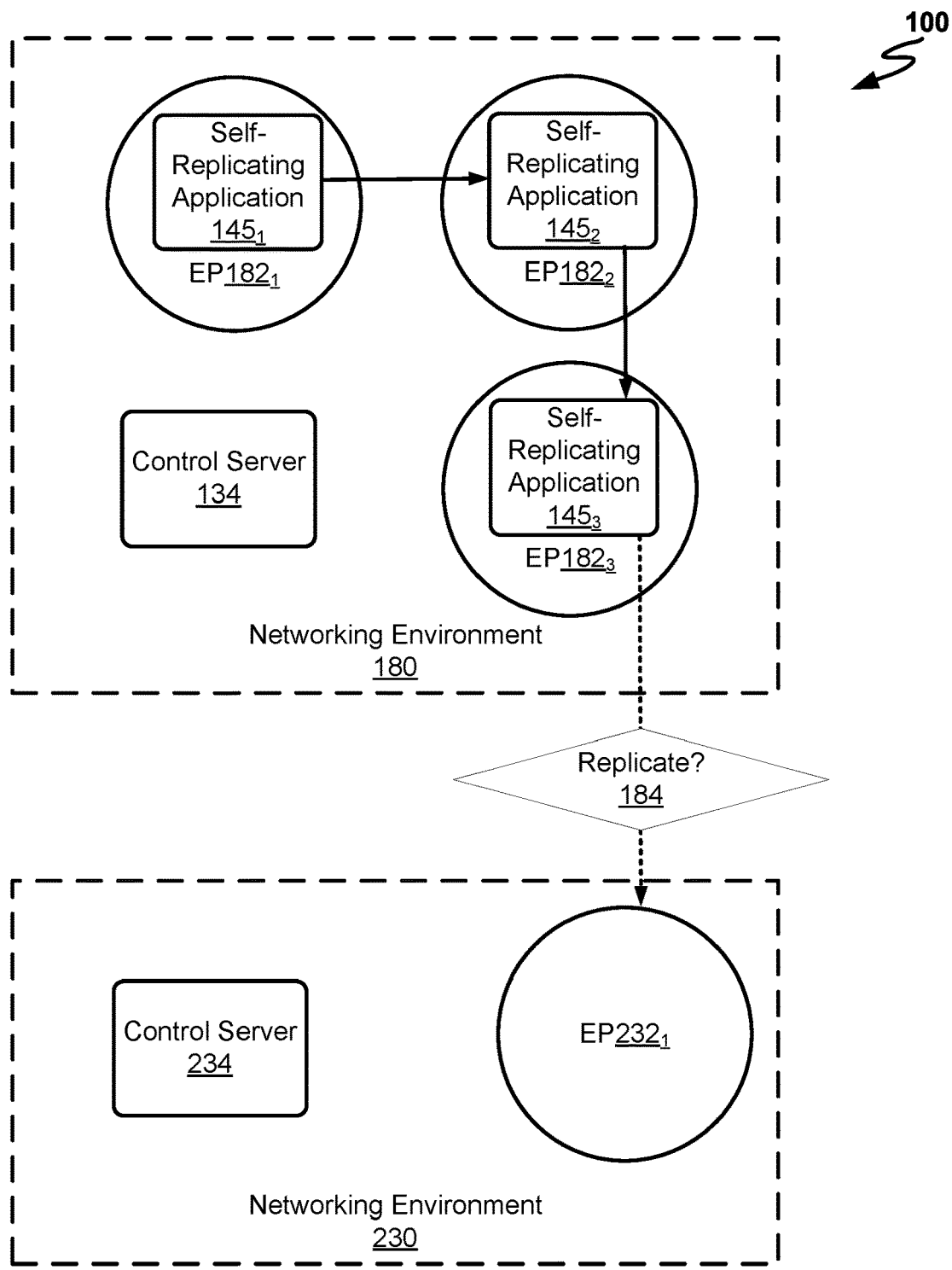
FIG. 1 depicts a block diagram of an example related to controlling application self-replication in a network.

The present disclosure provides an approach for controlling application self-replication in a network. In certain embodiments, a self-replicating application is configured to limit its own self-replication according to one or more rules. The rules may relate to attributes of devices (e.g., whether devices have public or private addresses), attributes of networking environments (e.g., whether certain addresses are present on white lists or black lists in the networking environment), user approval (e.g., provided by an administrator), and/or a variety of different types of conditions. In one example, a self-replicating application is configured to determine whether a first address (e.g., first IP address) is present on a white list and whether a second address (e.g., second IP address) is present on a blacklist for a networking environment prior to replicating within the networking environment. Thus, an administrator of the networking environment can control whether the self-replicating application replicates within the networking environment by determining whether to include these particular addresses on a white list and/or black list. The addresses may be, for example, domain name system (DNS) addresses, and the use of both a white listed address and a black listed address may increase security by requiring two conditions to be met for the self-replicating application to replicate within a networking environment.

In another example, a self-replicating application may only replicate within private address space, and may self-destruct or determine not to further replicate if public address space is detected, such as if the self-replicating application is able to resolve a public address or domain within the networking environment. In one example, private address space refers to IP addresses within the RFC 1918 range, while public address space refers to IP addresses not within the RFC 1918 range. IP addresses and RFC 1918 are included as examples only, and other types of private and/or public address space may be consistent with the present disclosure. For instance, embodiments of the present disclosure may also be utilized in cellular networks, and private address space and public address space may refer to private and public portions of cellular networks. Further, IP addresses are used only as an example, and any suitable type of addressing, whether currently implemented or implemented in the future may be used with the techniques described herein.

Furthermore, a self-replicating application may limit its own replication based on input from one or more users, such as administrators of networking environments. For instance, the self-replicating application may request permission from a management component in a networking environment to replicate within the networking environment, and may only proceed with replication if authorization is received from the management component (e.g., based on user input authorizing or denying the request). Thus, according to techniques described herein, a self-replicating application may limit its own replication based on a variety of different conditions, some of which may be controlled by users. As such, embodiments described herein improve upon conventional self-replicating applications, mitigating the risk of such applications being misused by providing effective controls on their replication.

FIG. 1 depicts a block diagram 100 of an example related to controlling application self-replication in a network.

Each of networking environments 180 and 230 represents a physical or virtual network in which computing devices are connected to one another. For example, as described in more detail below with respect to FIG. 3, networking environments 180 and 230 may be software defined networking (SDN) environments, such as separate logical overlay networks. In another example, networking environments 180 and 230 may be different physical local area networks (LANs), different sub-nets, different domains within a single network, different data centers in a multi-site networking environment, or the like.

Endpoints $182_{1-3}$ and $232_1$ generally represent physical or virtual computing devices within networking environments 180 and 230. A self-replicating application 145 "replicates" (e.g., launches new instances of) itself by identifying as many accessible endpoints as it can from each new endpoint on which it is launched and continuing its self-replication to the accessible endpoints as allowed based on one or more conditions.

Self-replicating application 145 may be an anti-worm or another type of self-replicating application, and may self-replicate with the intent of performing some benevolent function on as many endpoints as possible. In some embodiments, self-replicating application 145 scans networking environments for security vulnerabilities or rogue assets, and/or performs other types of issue detection, prevention, and/or mitigation actions. In certain embodiments, self-replicating application 145 attempts to gain access to as many endpoints as it can for the purpose of gathering data, such as for use in vulnerability detection and/or topology mapping.

Self-replicating application 145 is configured to limit its own replication based on one or more conditions. Thus, after replicating on endpoints $182_{1-3}$ (launching instances of self-replicating application $145_{1-3}$) in networking environment 180, self-replicating application 145 determines at 184 whether to replicate itself on endpoint 2321 in networking environment 230. For example, self-replicating application 145 may check in with a control server within a networking environment before determining whether to replicate within the networking environment. In one example, as described in more detail below with respect to FIG. 2, self-replicating application 145 checks whether a first address is present on a white list and whether a second address is present on a black list for the networking environment, both of which may be confirmed by the control server in the networking environment.

In an embodiment, control server 134 of networking environment 180 confirmed to self-replicating application 145 that one or more conditions were met, such as addresses being included on a white list and black list, user approval being given, and/or networking environment 180 comprising only private IP address space. Thus, self-replicating application 145 replicated within networking environment 180. Subsequently, self-replicating application 145 discovered a connection to endpoint $232_1$ in networking environment 230. Thus, at 184, self-replicating application 145 may check in with control server 234 of networking environment 230 in order to determine whether to replicate within networking environment 230. It is noted that checking in with a control server is one example of how self-replicating application 145 may check one or more conditions before replicating in a networking environment, and self-replicating application 145 may also or alternatively communicate with one or more other entities as part of this determination.

Figure 2:
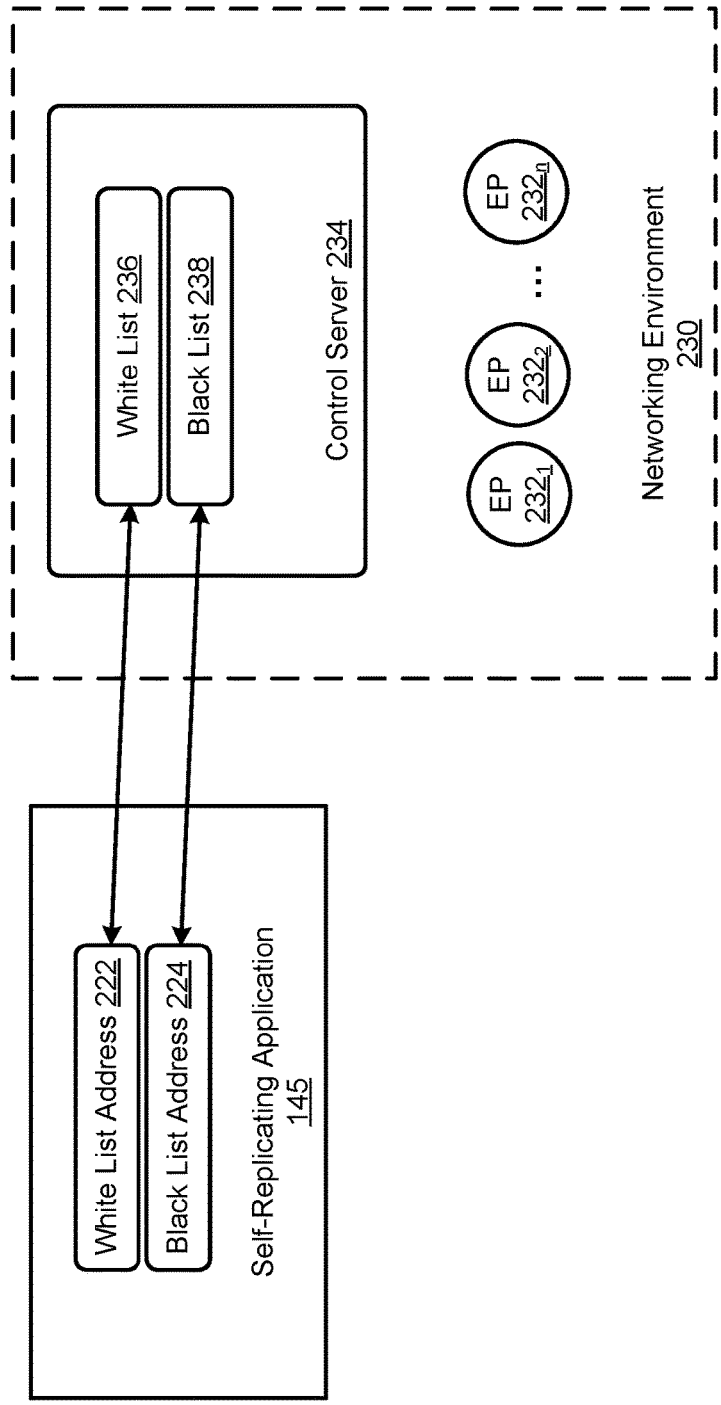
FIG. 2 depicts a block diagram of another example related to controlling application self-replication in a network.

FIG. 2 depicts a block diagram 200 of another example related to controlling application self-replication in a network. Block diagram 200 includes self-replicating application 145, networking environment 230, control server 234, and endpoint $232_1$ of FIG. 1. For example, block diagram 200 may depict one embodiment of the determination at step 184 of FIG. 1 by self-replicating application 145 of whether to replicate within networking environment 230.

Self-replicating application 145 comprises a white list address 222 and a black list address 224, which may have been configured by a developer or user of self-replicating application 145. In one embodiment, white list address 222 and black list address 224 are DNS addresses that must be included in a white list and black list, respectively, of a networking environment in order for self-replicating application 145 to replicate within the networking environment. A white list generally refers to a list of addresses that are "allowed" (e.g., granted access or approved for outbound and/or inbound communications with endpoints in the networking environment), while a black list generally refers to a list of addresses that are not allowed (e.g., not granted access or not approved for outbound and/or inbound communications with endpoints in the networking environment).

Control server 234 of networking environment 230 includes a white list 236 and a black list 238. An administrator on networking environment 230 may configure white list 236 and black list 238 on control server 234, and may add white list address 222 to white list 236 and black list address 224 to black list 238 in order to authorize self-replicating application 145 to replicate within networking environment 230.

Self-replicating application 145 determines whether white list address 222 is present on white list 236 and whether black list address 224 is present on black list 238. If each address is present on the respective list (and/or if one or more other conditions are met, such as networking environment 230 comprising only private IP address space), then self-replicating application 145 replicates itself within networking environment 230, such as to one or more of endpoints $232_{1-n}$. However, if white list address 222 is not present on white list 236 or if black list address 224 is not present on black list 238 (and/or if one or more other conditions are not met), then self-replicating application 145 will not replicate within networking environment 230. In some embodiments, if self-replicating application 145 is already present within networking environment 230 when it determines that one or more conditions for replication are not met, it will delete itself from networking environment 230.

Figure 3:
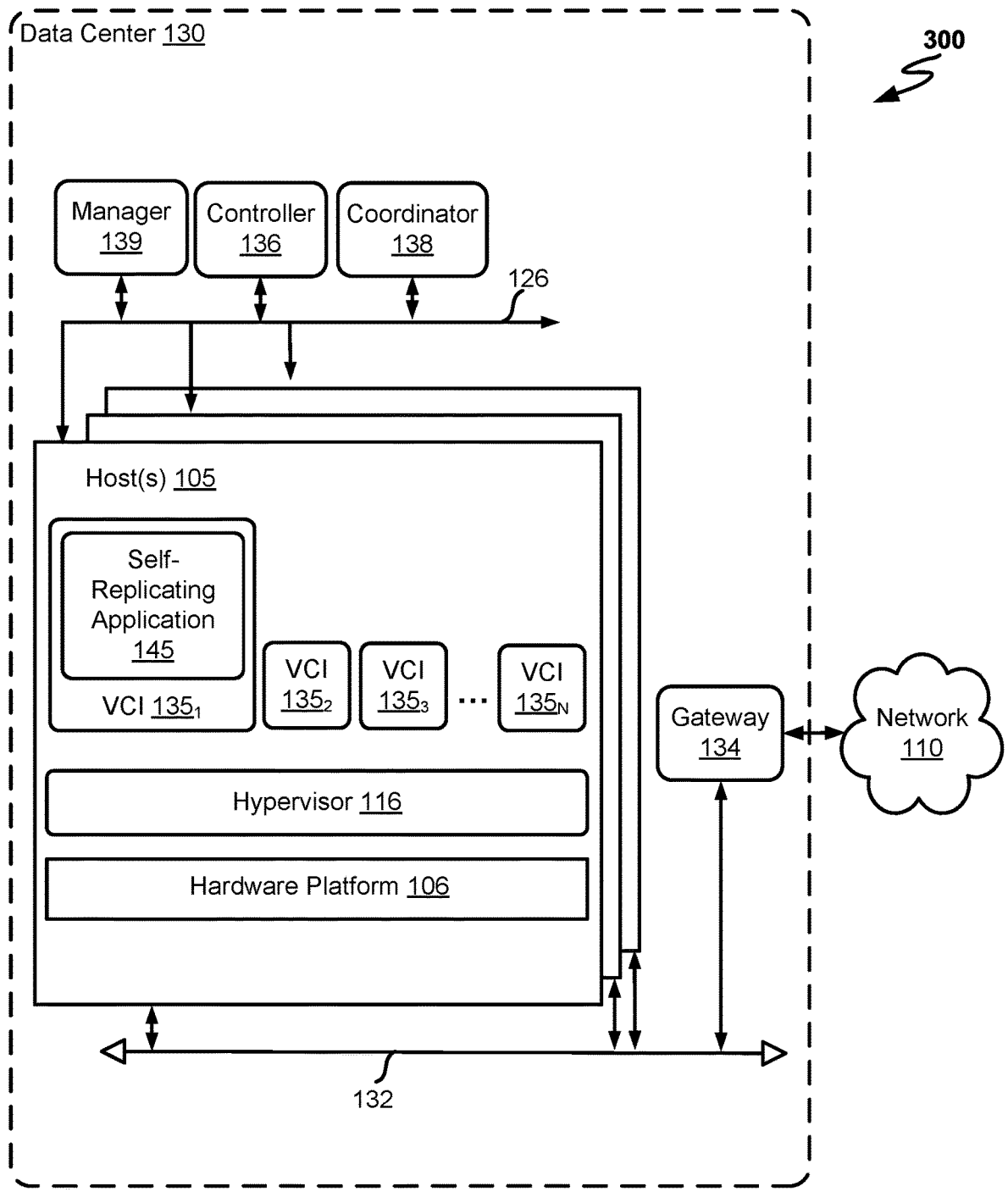
FIG. 3 depicts a block diagram of physical and virtual components of a network in which one or more embodiments of the present disclosure may be utilized.

FIG. 3 depicts a block diagram of physical and virtual components of a networking environment 300 in which one or more embodiments of the present disclosure may be utilized Networking environment 300 includes a data center 130 connected to network 110. Network 110 is generally representative of a network of computing entities such as a local area network ("LAN") or a wide area network ("WAN"), a network of networks, such as the Internet, or any connection over which data may be transmitted.

Data center 130 generally represents a set of networked computing entities, and may comprise a logical overlay network. Data center 130 includes host(s) 105, a gateway 134, a data network 132, which may be a Layer 3 network, and a management network 126. Data network 132 and management network 126 may be separate physical networks or different virtual local area networks (VLANs) on the same physical network.

Each of hosts 105 may be constructed on a server grade hardware platform 106, such as an x86 architecture platform. For example, hosts 105 may be geographically co-located servers on the same rack or on different racks. Host 105 is configured to provide a virtualization layer, also referred to as a hypervisor 116, that abstracts processor, memory, storage, and networking resources of hardware platform 106 into multiple virtual computing instances (VCIs) $135_1$ to $135_N$ (collectively referred to as VCIs 135 and individually referred to as VCI 135) that run concurrently on the same host. VCIs 135 may, for example, be virtual machines (VMs), virtual appliances, containers, and/or the like. Hypervisor 116 may run in conjunction with an operating system (not shown) in host 105. In some embodiments, hypervisor 116 can be installed as system level software directly on hardware platform 106 of host 105 (often referred to as "bare metal" installation) and be conceptually interposed between the physical hardware and the guest operating systems executing in the virtual machines. In some implementations, hypervisor 116 may comprise system level software as well as a "Domain 0" or "Root Partition" virtual machine (not shown) which is a privileged machine that has access to the physical hardware resources of the host. In this implementation, one or more of a virtual switch, virtual tunnel endpoint (VTEP), etc., along with hardware drivers, may reside in the privileged virtual machine. Although aspects of the disclosure are described with reference to VMs, the teachings herein also apply to other types of VCIs or data compute nodes (DCNs), such as containers, which may be referred to as Docker containers, isolated user space instances, namespace containers, etc. In certain embodiments, VCIs 135 may be replaced with containers that run on host 105 without the use of a hypervisor.

VCI $135_1$ includes self-replicating application 145 of FIGS. 1 and 2. For instance, self-replicating application 145 may replicate within one or more L2 networks within data center 130.

Gateway 134 provides VCIs 135 and other components in data center 130 with connectivity to network 110, and is used to communicate with destinations (not shown) external to data center 130. Gateway 134 may be a VCI, a physical device, or a software module running within host 105.

Controller 136 generally represents a control plane that manages configuration of VCIs 135 within data center 130. Controller 136 may be a computer program that resides and executes in a central server in data center 130 or, alternatively, controller 136 may run as a virtual appliance (e.g., a VM) in one of hosts 105. Although shown as a single unit, it should be understood that controller 136 may be implemented as a distributed or clustered system. That is, controller 136 may include multiple servers or VCIs that implement controller functions. Controller 136 is associated with one or more virtual and/or physical CPUs (not shown). Processor(s) resources allotted or assigned to controller 136 may be unique to controller 136, or may be shared with other components of data center 130. Controller 136 communicates with hosts 105 via management network 126.

Manager 139 generally represents a management plane comprising one or more computing devices responsible for receiving logical network configuration inputs, such as from a network administrator, defining one or more endpoints (e.g., VMs and/or containers) and the connections between the endpoints, as well as rules governing communications between various endpoints. In some embodiments, manager 139 communicates with hosts 105 via controller 136, which receives and transmits data to and from hosts 105 via management network 126.

Coordinator 138 generally represents a centralized management component for instances of self-replicating application 145, and may be implemented as one or more physical or virtual computing devices. In some embodiments, coordinator 138 is a VCI 135. Coordinator 138 allows the various instances of self-replicating application 145 to be centrally managed, such as for the purpose of controlling a distributed vulnerability scan. In some embodiments, coordinator 138 sends various parameters to each instance of self-replicating application 145, and each instance of self-replicating application 145 sends check-in messages to coordinator 138 upon starting and/or at regular intervals. Parameters provided by coordinator 138 to instances of self-replicating application 145 may include, for example, scanning targets for a distributed vulnerability scan (e.g., IP addresses of the entities to be scanned), scan timing information for use in determining when to perform scans of scanning targets (e.g., information indicating time windows assigned to an instance of self-replicating application 145 for performing scans), conditions related to limiting replication such as white list addresses and/or black list addresses, and/or the like.

Communication between self-replicating application 145 and coordinator 138 is described in more detail below with respect to FIG. 4.

Figure 4:
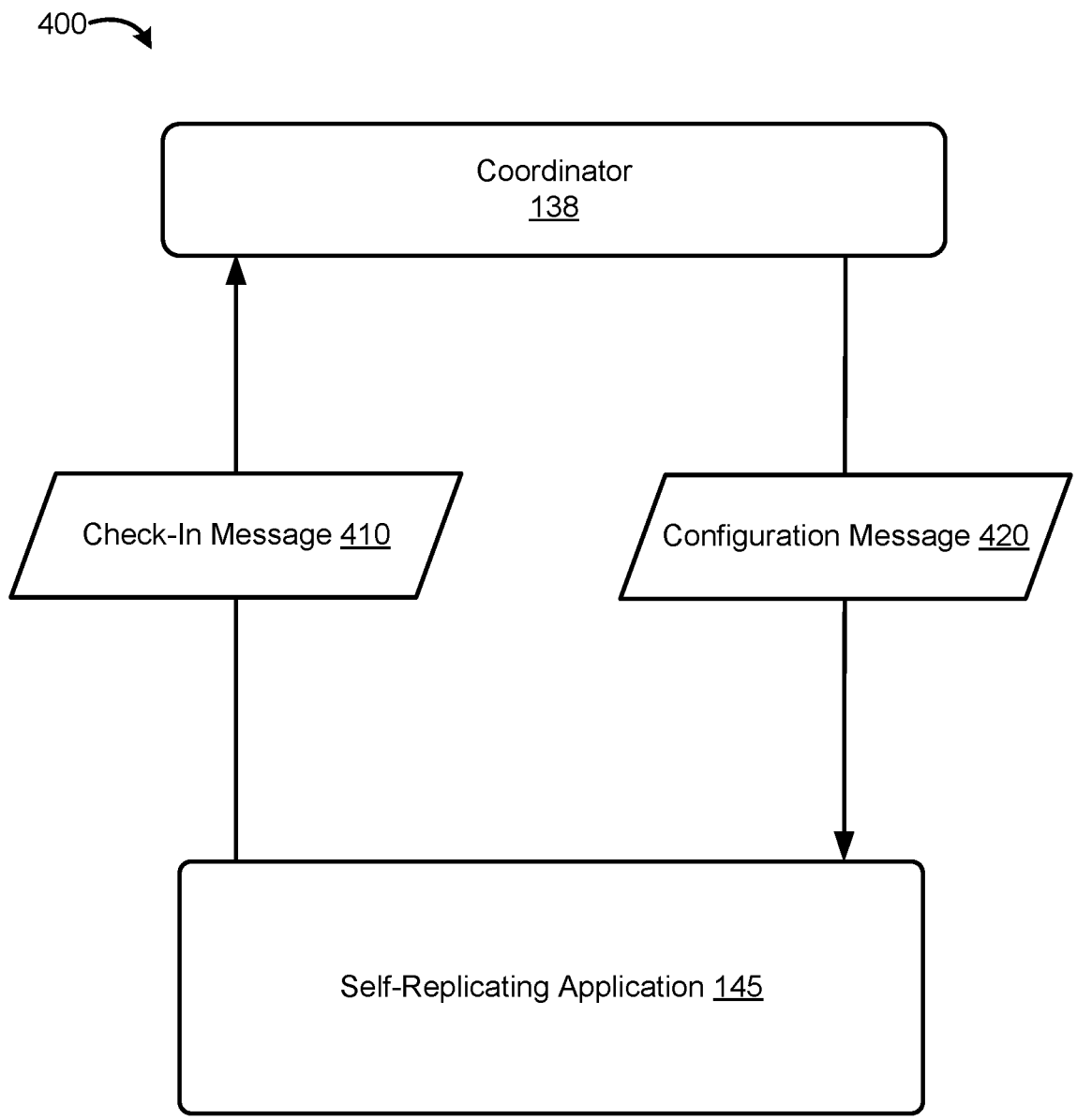
FIG. 4 depicts a block diagram of another example related to controlling application self-replication in a network.

FIG. 4 depicts a block diagram 400 of another example related to controlling application self-replication in a network. Block diagram 400 includes coordinator 138 of FIG. 3 and self-replicating application 145 of FIGS. 1-3.

Self-replicating application 145 sends a check-in message 410 to coordinator 138, such as upon starting and/or at regular intervals. Check-in message 410 may include, for example, attributes related to self-replicating application 145, such as attributes of a computing device on which self-replicating application 145 is running (e.g., connectivity information indicating L2 network connectivity and/or devices to which the instance of self-replicating application 145 is connected, device capabilities such as protocols supported, resource availability information such as memory, processor, and/or communication resource utilization, and/or the like). Coordinator 138 may determine one or more scanning parameters based on the attributes. Coordinator 138 then sends a configuration message 420 to self-replicating application, such as including the scanning parameters. Scanning parameters may include, for instance, a list of scanning targets for self-replicating application 145 (e.g., a list of computing devices that self-replicating application 145 is to perform a vulnerability scan of), a check-in frequency (e.g., indicating how often self-replicating application 145 should check back in with coordinator 138), scan timing information (e.g., indicating when self-replicating application 145 is to perform scans of its assigned scanning targets), and/or the like.

After performing one or more scans, self-replicating application 145 may send results of the scans back to coordinator 138, such as indicating whether any vulnerabilities were detected. In one example, a vulnerability is detected if data gathered in the scan matches conditions indicated in one or more rules or signatures to correspond to a known vulnerability or issue. Scan results may be included in check-in messages, which may be sent at regular intervals based on a check-in frequency indicated in the configuration message. Coordinator 138 may send updated configuration messages with potentially updated scanning parameters, such as in response to subsequent check-in messages.

Thus, coordinator 138 is able to control distributed operations by instances of self-replicating application 145 in one or more networking environments in a centralized manner. It is noted that distributed vulnerability scans are included as one example, and other types of operations may be performed by self-replicating application 145 and centrally managed by coordinator 138. Furthermore, coordinator 138 may also control replication of self-replicating application 145. For instance, coordinator 138 may indicate, in a configuration message to self-replicating application 145, authorized replication destinations and/or conditions for use in determining whether to replicate.

Figure 5:
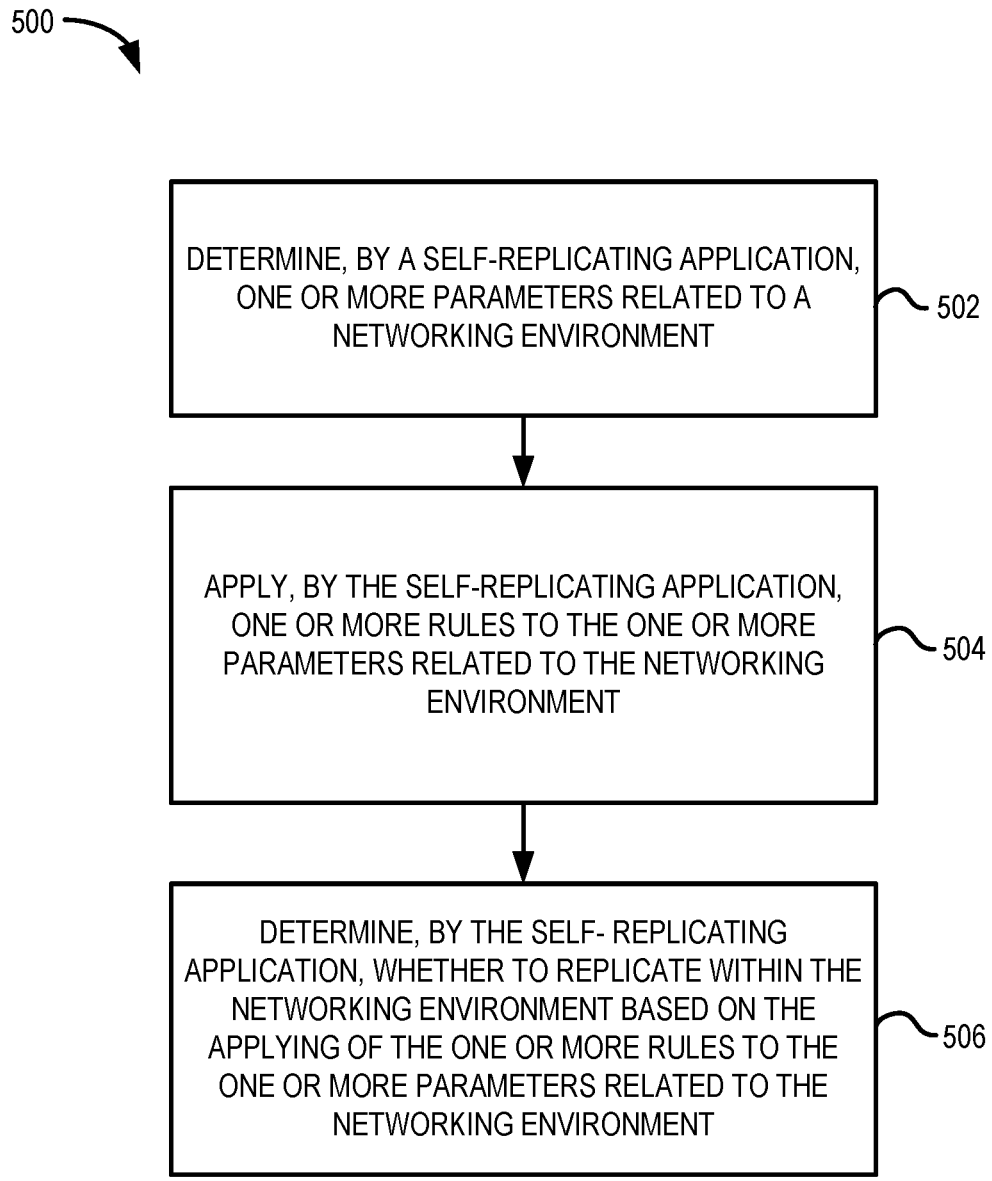
FIG. 5 depicts a flow diagram of example operations related to controlling application self-replication in a network.

FIG. 5 depicts a flow diagram of operations 500 related to controlling application self-replication in a networking environment. In some embodiments, operations 500 are performed by self-replicating application 145 of FIGS. 1-4.

At step 502, a self-replicating application determines one or more parameters related to a networking environment. The parameters may include, for example, addresses included in a white list and/or black list, whether the networking environment comprises public address space, whether user approval has been granted for the self-replicating application to replicate within the networking environment, and/or the like.

At step 504, the self-replicating application applies one or more rules to the one or more parameters related to the networking environment. In some embodiments, applying, by the self-replicating application, the one or more rules to the one or more parameters related to the networking environment comprises: determining, by the self-replicating application, whether a first address is present on a whitelist for the networking environment; and determining, by the self-replicating application, whether a second address is present on a blacklist for the networking environment. The first address and the second address may, for example, comprise domain name system (DNS) addresses.

In certain embodiments, applying, by the self-replicating application, the one or more rules to the one or more parameters related to the networking environment comprises determining, by the self-replicating application, whether the networking environment comprises public address space and/or whether a user has authorized the self-replicating application to replicate within the networking environment.

At step 506, the self- replicating application determines whether to replicate within the networking environment based on the applying of the one or more rules to the one or more parameters related to the networking environment. Determining, by the self-replicating application, whether to replicate within the networking environment may occur when the self-replicating application has not yet entered the networking environment.

Certain embodiments further comprise receiving, by the self-replicating application, a list of targets to scan within the networking environment and/or scan timing information for use in determining when to perform scans on targets within the networking environment. For example, the self-replicating application may send a check-in message to a coordinator, which may send a configuration message to the self-replicating application including information such as the list of targets and/or the scan timing information.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs) --CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operating system in which at least one application runs. It should be noted that these embodiments may also apply to other examples of contexts, such as containers not including a guest operating system, referred to herein as "OS-less containers" (see, e.g., www.docker.com). OS-less containers implement operating system—level virtualization, wherein an abstraction layer is provided on top of the kernel of an operating system on a host computer. The abstraction layer supports multiple OS-less containers each including an application and its dependencies. Each OS-less container runs as an isolated process in userspace on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O. The term "virtualized computing instance" as used herein is meant to encompass both VMs and OS-less containers.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

We claim:

1. A method of controlling application self-replication in a network, comprising:
   determining, by a self-replicating application, one or more parameters related to a networking environment based on communicating, by the self-replicating application, with a component in the networking environment before the self-replicating application has entered the networking environment;
   applying, by the self-replicating application, one or more rules to the one or more parameters related to the networking environment; and
   before the self-replicating application has entered the networking environment, determining, by the self-replicating application, whether to replicate within the networking environment based on the applying of the one or more rules to the one or more parameters related to the networking environment.

2. The method of claim 1, wherein applying, by the self-replicating application, the one or more rules to the one or more parameters related to the networking environment comprises:
   determining, by the self-replicating application, whether a first address is present on a whitelist for the networking environment; and
   determining, by the self-replicating application, whether a second address is present on a blacklist for the networking environment.

3. The method of claim 2, wherein the first address and the second address comprise domain name system (DNS) addresses.

4. The method of claim 1, wherein applying, by the self-replicating application, the one or more rules to the one or more parameters related to the networking environment comprises determining, by the self-replicating application, whether the networking environment comprises public address space.

5. The method of claim 1, further comprising receiving, by the self-replicating application, a list of targets to scan within the networking environment.

6. The method of claim 5, wherein applying, by the self-replicating application, the one or more rules to the one or more parameters related to the networking environment comprises determining whether a user has authorized the self-replicating application to replicate within the networking environment.

7. The method of claim 1, further comprising receiving, by the self-replicating application, scan timing information for use in determining when to perform scans on targets within the networking environment.

8. The method of claim 1, further comprising sending, by the self-replicating application, a check-in message to a coordinator.

9. A system for controlling application self-replication in a network, comprising:
   at least one memory; and
   at least one processor coupled to the at least one memory, the at least one processor and the at least one memory configured to:
      determine, by a self-replicating application, one or more parameters related to a networking environment based on communicating, by the self-replicating application, with a component in the networking environment before the self-replicating application has entered the networking environment;
      apply, by the self-replicating application, one or more rules to the one or more parameters related to the networking environment; and
      before the self-replicating application has entered the networking environment, determine, by the self-replicating application, whether to replicate within the networking environment based on the applying of the one or more rules to the one or more parameters related to the networking environment.

10. The system of claim 9, wherein applying, by the self-replicating application, the one or more rules to the one or more parameters related to the networking environment comprises:
   determining, by the self-replicating application, whether a first address is present on a whitelist for the networking environment; and
   determining, by the self-replicating application, whether a second address is present on a blacklist for the networking environment.

11. The system of claim 10, wherein the first address and the second address comprise domain name system (DNS) addresses.

12. The system of claim 9, wherein applying, by the self-replicating application, the one or more rules to the one or more parameters related to the networking environment comprises determining, by the self-replicating application, whether the networking environment comprises public address space.

13. The system of claim 9, wherein the at least one processor and the at least one memory are further configured to receive, by the self-replicating application, a list of targets to scan within the networking environment.

14. The system of claim 13, wherein applying, by the self-replicating application, the one or more rules to the one or more parameters related to the networking environment comprises determining whether a user has authorized the self-replicating application to replicate within the networking environment.

15. The system of claim 9, wherein the at least one processor and the at least one memory are further configured to receive, by the self-replicating application, scan timing information for use in determining when to perform scans on targets within the networking environment.

16. The system of claim 9, wherein the at least one processor and the at least one memory are further configured to send, by the self-replicating application, a check-in message to a coordinator.

17. A non-transitory computer-readable medium storing instructions that, when executed by one or more processors, cause the one or more processors to:
  determine, by a self-replicating application, one or more parameters related to a networking environment based on communicating, by the self-replicating application, with a component in the networking environment before the self-replicating application has entered the networking environment;
  apply, by the self-replicating application, one or more rules to the one or more parameters related to the networking environment; and
  before the self-replicating application has entered the networking environment, determine, by the self-replicating application, whether to replicate within the networking environment based on the applying of the one or more rules to the one or more parameters related to the networking environment.

18. The non-transitory computer-readable medium of claim 17, wherein applying, by the self-replicating application, the one or more rules to the one or more parameters related to the networking environment comprises:
  determining, by the self-replicating application, whether a first address is present on a whitelist for the networking environment; and
  determining, by the self-replicating application, whether a second address is present on a blacklist for the networking environment.

19. The non-transitory computer-readable medium of claim 17, wherein the first address and the second address comprise domain name system (DNS) addresses.

20. The non-transitory computer-readable medium of claim 17, wherein applying, by the self-replicating application, the one or more rules to the one or more parameters related to the networking environment comprises determining, by the self-replicating application, whether the networking environment comprises public address space.

* * * * *